UNITED STATES PATENT OFFICE.

LOUIS M. ATHA, OF NEWARK, NEW JERSEY.

PROCESS OF MAKING STEEL.

943,171. Specification of Letters Patent. Patented Dec. 14, 1909.

No Drawing. Application filed January 5, 1909. Serial No. 470,817.

*To all whom it may concern:*

Be it known that I, LOUIS M. ATHA, a citizen of the United States, and a resident of Newark, county of Essex, and State of New Jersey, have invented certain new and useful Improvements in Processes of Making Steel, of which the following is a specification.

The ordinary process of making steel from a mixture of pig iron, steel and iron scrap in a basic open hearth furnace is expensive in certain localities owing to the high price of pig and also to the large amount of lime stone necessary to add to the charge to eliminate the phosphorus. The pig iron and cast iron are used in order to obtain a sufficient amount of carbon to melt down the steel. Some attempts have been made to introduce sufficient carbon to the charge without using pig iron or cast iron. This has been done by adding the carbon in the form of ordinary coke, charcoal or anthracite in pulverized form, but it has not proved satisfactory as the greater portion of the carbon so introduced is carried off with the vapors, or otherwise, during the melting down process and before the carbon can be taken up or absorbed by the metal. After much experimenting I have discovered that if carbon of a certain character is used during the melting down of the charge, substantially all of such carbon will be absorbed during the melting down and a high grade steel produced.

In carrying out my process I use carbon, preferably in the form of what is known as oil retort carbon. This carbon is preferably pulverized before it is added to the charge. This grade of carbon is very hard and will remain in the charge during the melting down for a much longer time than other carbon. It is therefore absorbed and not carried off by the vapors.

In carrying out my process I introduce in an open hearth furnace lime stone or other suitable flux; then the steel and iron scrap and then the pulverized carbon, and on top of this the pig or cast iron. The whole is melted or boiled down and the product is a fine grade of steel.

In some instances I may put the carbon in the furnace first, in which case during the process of melting down the carbon has to pass through the melted charge, and before it has an opportunity to escape or pass off with the vapors it is absorbed by the melted metal. With a certain grade or quality of steel scrap, the iron, in the form of scrap, cast or pig, may be dispensed with. I may also in certain cases dispense with the use of lime stone.

I preferably use these materials in the following proportions, although it is to be understood that these proportions may be changed without departing from my invention or the spirit thereof.

Steel scrap about _____ 75 per cent.
Cast iron or pig about _ 18 per cent.
Carbon about _____ 2 per cent.
Lime stone about _____ 5 per cent.

These proportions give a saving of about 30 per cent. of pig and 50 per cent. of lime stone. By using steel scrap, which is low in phosphorus, it is not necessary to use as large a quantity of lime stone as has heretofore been used in the ordinary process of making steel.

By the term "iron" as used in the claims, I mean, ordinary cast iron, or pig iron or both.

While I have described my process as used in an open hearth furnace, it is to be understood that it may also be carried out with success in an electric furnace.

Having now described my invention, what I claim as new and desire to secure by Letters Patent is:

1. The process of making steel which comprises the steps of charging a furnace with steel scrap and oil retort carbon, and boiling down the charge.

2. The process of making steel which comprises the steps of charging a furnace with steel scrap, iron, and oil retort carbon, and boiling down the charge.

3. The process of making steel which comprises the steps of charging a furnace with steel scrap, a suitable flux, and oil retort carbon, and boiling down the charge.

4. The process of making steel which consists in charging a furnace with steel scrap, iron, a suitable flux, and oil retort carbon, and boiling down the charge.

5. The process of making steel which consists in charging a furnace with lime stone, steel scrap, pulverized oil retort carbon and cast iron, and then melting down the charge.

6. The process of making steel which consists in charging a furnace first, with lime stone, then with steel scrap, next with pulverized oil retort carbon, and finally with cast iron and then melting down the charge.

7. The process of making steel which consists in charging a furnace with steel scrap about 75 per cent., cast iron and pig iron about 18 per cent., carbon about 2 per cent. and lime stone about 5 per cent.

8. The process of making steel which consists in charging a furnace with scrap steel about 75 per cent., cast iron and pig iron about 18 per cent., pulverized oil retort carbon about 2 per cent. and lime stone about 5 per cent.

In witness whereof I have hereunto set my hand at Newark, county of Essex and State of New Jersey this 29th day of December, 1908.

LOUIS M. ATHA.

In presence of—
 HENRY G. ATHA,
 JOHN J. RANAGAN.